United States Patent
Ueno

(10) Patent No.: US 11,731,409 B2
(45) Date of Patent: Aug. 22, 2023

(54) DECORATIVE SHEET AND DECORATIVE MATERIAL USING SAME

(71) Applicant: Dai Nippon Printing Co., Ltd., Tokyo (JP)

(72) Inventor: Masanori Ueno, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 147 days.

(21) Appl. No.: 16/650,589

(22) PCT Filed: Sep. 27, 2018

(86) PCT No.: PCT/JP2018/035839
§ 371 (c)(1),
(2) Date: May 5, 2020

(87) PCT Pub. No.: WO2019/065801
PCT Pub. Date: Apr. 4, 2019

(65) Prior Publication Data
US 2021/0001611 A1    Jan. 7, 2021

(30) Foreign Application Priority Data
Sep. 27, 2017  (JP) ................................. 2017-187138

(51) Int. Cl.
*B32B 27/20* (2006.01)
*B32B 38/00* (2006.01)
(Continued)

(52) U.S. Cl.
CPC ................ *B32B 27/20* (2013.01); *B32B 3/30* (2013.01); *B32B 7/023* (2019.01); *B32B 7/027* (2019.01);
(Continued)

(58) Field of Classification Search
CPC ........... E04B 1/80; C09D 11/037; B32B 7/12; B32B 27/20; B32B 38/145; B32B 7/027; B32B 3/30
(Continued)

(56) References Cited

U.S. PATENT DOCUMENTS

2017/0029627 A1* 2/2017 Isobe .................... C01G 45/125
2017/0217136 A1  8/2017 Noda et al.
2018/0022076 A1* 1/2018 Ueno ...................... B32B 33/00
                                                               428/336

FOREIGN PATENT DOCUMENTS

JP      2000-334892 A      12/2000
JP      2000334892 A  *   12/2000
(Continued)

OTHER PUBLICATIONS

Machine_English_translation_JP_2016168713_A; Takenaka, S.; Decorative Sheet and Decorative Material; Sep. 23, 2016; EPO; whole document (Year: 2016).*

(Continued)

*Primary Examiner* — Tahseen Khan
(74) *Attorney, Agent, or Firm* — Locke Lord LLP; James E. Armstrong, IV; Nicholas J. DiCeglie, Jr.

(57) ABSTRACT

There is provided a decorative sheet which has satisfactory heat-shielding properties and can exhibit a design which is excellent in the degree of darkness. The decorative sheet includes an infrared-reflective substrate, and a decorative layer disposed on the substrate and including a solid printing layer and a picture layer, wherein the solid printing layer contains an infrared-transparent or infrared-reflective pigment and a binder resin, the infrared-transparent or infrared-reflective pigment containing (A) at least three compounds selected from the pigment group consisting of a quinacridone, an isoindolinone, a nickel azo complex and a phthalocyanine, or (B) at least one compound selected from the (Continued)

pigment group consisting of a composite oxide containing manganese and at least one metal element other than manganese, an azomethine-azo compound and a perylene compound, and wherein the picture layer at least partly contains carbon black and a binder resin.

19 Claims, 1 Drawing Sheet

(51) Int. Cl.
*B32B 7/023* (2019.01)
*B32B 7/027* (2019.01)
*B32B 7/12* (2006.01)
*E04B 1/80* (2006.01)
*B32B 3/30* (2006.01)
*C09D 11/037* (2014.01)

(52) U.S. Cl.
CPC .............. *B32B 7/12* (2013.01); *B32B 38/145* (2013.01); *C09D 11/037* (2013.01); *E04B 1/80* (2013.01); *B32B 2307/304* (2013.01); *B32B 2307/4026* (2013.01); *B32B 2307/412* (2013.01); *B32B 2307/416* (2013.01); *B32B 2451/00* (2013.01)

(58) Field of Classification Search
USPC ......................................................... 428/142
See application file for complete search history.

(56) References Cited

FOREIGN PATENT DOCUMENTS

| | | | |
|---|---|---|---|
| JP | 2007-168176 | A | 7/2007 |
| JP | 2012-82602 | A | 4/2012 |
| JP | 2013-086451 | A | 5/2013 |
| JP | 2014-172197 | A | 9/2014 |
| JP | 2016-168711 | A | 9/2016 |
| JP | 2016-168712 | A | 9/2016 |
| JP | 2016-168786 | A | 9/2016 |
| JP | 2016168713 | A * | 9/2016 |
| JP | 6111559 | B2 | 4/2017 |
| JP | 2017-136788 | A | 8/2017 |
| WO | 2016/125906 | A1 | 8/2016 |
| WO | 2016/125907 | A1 | 8/2016 |
| WO | WO-2016125907 | A1 * | 8/2016 ............... B32B 9/00 |

OTHER PUBLICATIONS

Machine_English_translation_JP_2000334892_A; Suzuki, Y., et. al.; Decorative Material; Dec. 5, 2000; EPO; whole document (Year: 2000).*
International Search Report dated Dec. 25, 2018, issued for PCT/JP2018/035839.
Office Action dated May 6, 2021, issued for the corresponding Indian Patent Application No. 202047017599.
Extended European Search Report issued in EP 18863083.4, dated Jun. 11, 2021.
Office Action issued in corresponding Chinese Patent Application No. CN 201880072041.8, dated Nov. 2, 2021.

* cited by examiner

[Fig. 1]
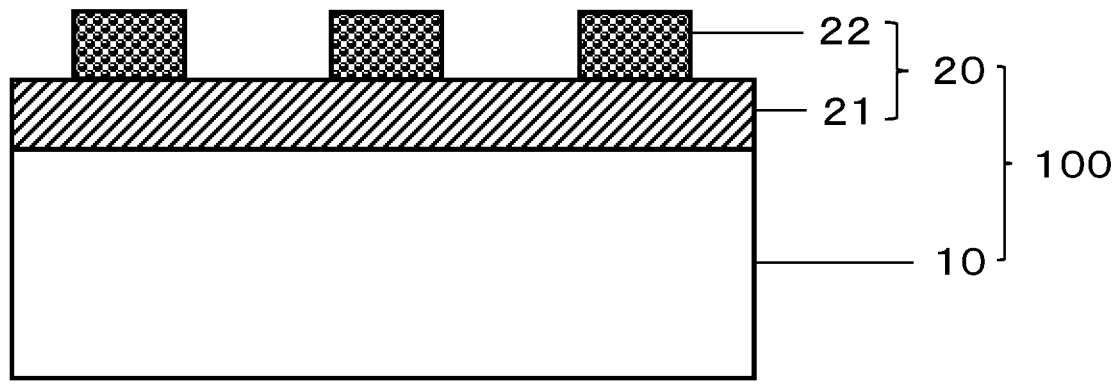
[Fig. 2]
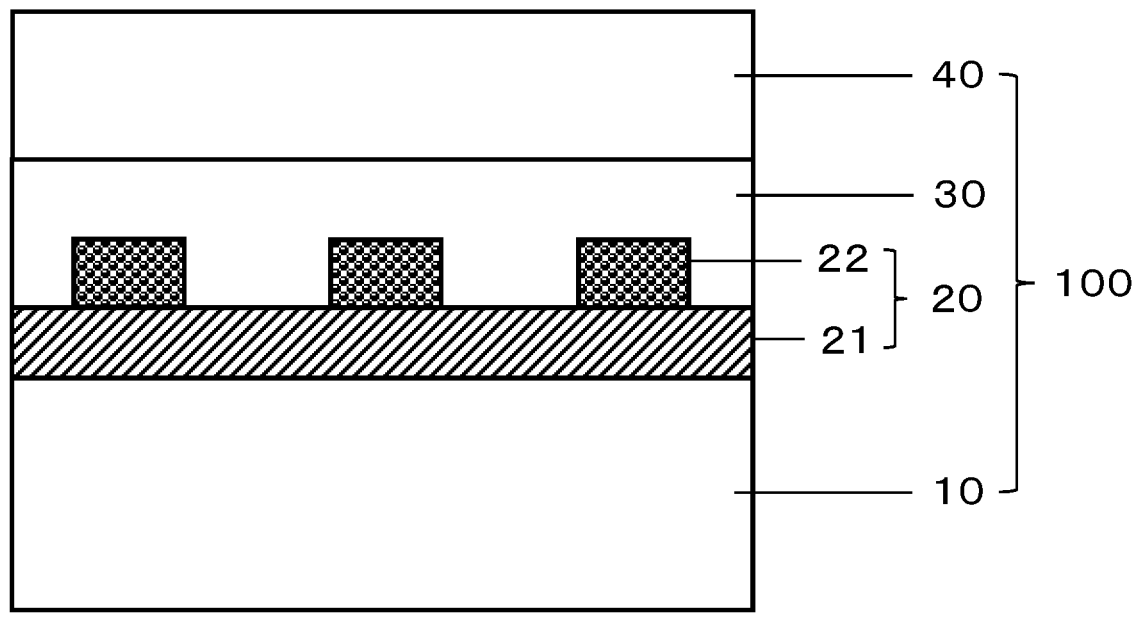

DECORATIVE SHEET AND DECORATIVE MATERIAL USING SAME

TECHNICAL FIELD

The present invention relates to a decorative sheet and to a decorative material using the sheet.

BACKGROUND ART

A laminate consisting of a base (adherend), such as a metal member, a resin member or a wood member, and a decorative sheet which is attached to the base to enhance the design, has been proposed for use in an architectural member or structure such as a floor, a wall, a window, a door, a handrail, a fence, a railing or floor grates. Such a laminate, consisting of a base (adherend) and a decorative sheet attached to the base, will be hereinafter referred to as a "decorative material".

In order for a decorative sheet to have a premium feel, the decorative sheet is sometimes prepared in a dark color. In this case, an ink containing carbon black, which is a common black pigment, is generally used to form a solid printing layer and a picture layer.

However, when a decorative sheet containing carbon black is used in a place where the sheet receives a large amount of sunlight, the carbon black will absorb infrared light, thereby raising the temperature of the decorative sheet. This may result in problems such as deformation of the decorative sheet, delamination between an adherend and the decorative sheet, etc. Thus, a decorative sheet, having a solid printing layer and a picture layer which have been formed using an ink containing carbon black, is insufficient in the heat-shielding properties.

In order to solve the problem of heat-shielding properties, a technique as disclosed e.g. in PTL 1 has been proposed.

CITATION LIST

Patent Literature

PTL 1; Japanese Patent No. 6111559

SUMMARY OF INVENTION

Technical Problem

PTL 1 has proposed a heat-shielding decorative sheet produced by forming a solid printing layer with a wood grain pattern on a light-colored substrate containing an infrared-reflective pigment such as titanium oxide, and then forming a picture layer with a vessel pattern using a black pigment composed of an azomethine-azo pigment.

Though the azomethine-azo pigment used in PTL 1 is black-colored, it can reduce absorption of infrared light. Therefore, the decorative sheet has relatively good heat-shielding properties. However, the decorative sheet of PTL 1 is insufficient in the degree of darkness, and therefore cannot exhibit a design of a high degree of darkness, such as wood grain, at a high level. The degree of darkness may be improved to some extent by increasing the thickness of the picture layer or by using the azomethine-azo pigment in a large amount; however, this may result in a worsening of printability such as blocking or back-trapping, weatherability, etc.

The present invention has been made in the above situation. It is therefore an object of the present invention to provide a decorative sheet which has satisfactory heat-shielding properties and can exhibit a design which is excellent in the degree of darkness, and to provide a decorative material using the sheet.

Solution to Problem

In order to solve the above problems, the present invention provides the following products [1] and [2].

[1] A decorative sheet including an infrared-reflective substrate, and a decorative layer disposed on the substrate and including a solid printing layer and a picture layer, wherein the solid printing layer contains an infrared-transparent or infrared-reflective pigment and a binder resin, the infrared-transparent or infrared-reflective pigment containing (A) at least three compounds selected from the pigment group consisting of a quinacridone, an isoindolinone, a nickel azo complex and a phthalocyanine, or (B) at least one compound selected from the pigment group consisting of a composite oxide containing manganese and at least one metal element other than manganese, an azomethine-azo compound and a perylene compound, and wherein the picture layer contains carbon black and a binder resin.

[2] A decorative material including an adherend and the decorative sheet described in [1] above.

Advantageous Effects of Invention

According to the present invention, it is possible to provide a decorative sheet which has satisfactory heat-shielding properties and can exhibit a design which is excellent in the degree of darkness, and to provide a decorative material using the sheet.

BRIEF DESCRIPTION OF DRAWINGS

FIG. 1 is a cross-sectional view illustrating an embodiment of a decorative sheet according to the present invention; and FIG. 2 is a cross-sectional view illustrating another embodiment of the decorative sheet according to the present invention.

DESCRIPTION OF EMBODIMENTS

[Decorative Sheet]

The decorative sheet of the present invention includes an infrared-reflective substrate, and a decorative layer disposed on the substrate and including a solid printing layer and a picture layer, wherein the solid printing layer contains an infrared-transparent or infrared-reflective pigment and a binder resin, the infrared-transparent or infrared-reflective pigment containing (A) at least three compounds selected from the pigment group consisting of a quinacridone, an isoindolinone, a nickel azo complex and a phthalocyanine, or (B) at least one compound selected from the pigment group consisting of a composite oxide containing manganese and at least one metal element other than manganese, an azomethine-azo compound and a perylene compound, and wherein the picture layer contains carbon black and a binder resin.

As used herein, infrared (light) refers to the so-called "near-infrared (light)" having a wavelength of 780 to 2500 nm.

FIGS. 1 and 2 are cross-sectional views showing decorative sheets 100 according to different embodiments.

The decorative sheets 100 of FIGS. 1 and 2 each include an infrared-reflective substrate 10, and a decorative layer 20 disposed on the substrate 10 and including a solid printing layer 21 and a picture layer 22. The decorative sheet 100 of FIG. 2 also includes a transparent resin layer 30 and a surface protective layer 40 on the decorative layer 20.

<Infrared-Reflective Substrate>

The infrared-reflective substrate may be, for example, one which contains a binder resin and an infrared-reflective pigment. The "infrared-reflective substrate" hereinafter may sometimes be referred to simply as the "substrate".

A thermoplastic resin, such as a polyolefin resin, a polyester resin, a polycarbonate resin, an acrylonitrile-butadiene-styrene resin (hereinafter also referred to as an "ABS resin"), an acrylic resin or a vinyl chloride resin, is preferably used as the binder resin.

Among them, a polyolefin resin, a polyester resin, a polycarbonate resin and an ABS resin are preferred from the viewpoint of obtaining superior surface properties such as weatherability and scratch resistance, and a polyolefin resin is more preferred from the viewpoint of processability.

There is no particular limitation on the polyolefin resin. Examples of the polyolefin resin include polyethylene (low-density, medium-density, high-density), polypropylene, polymethylpentene, polybutene, an ethylene-propylene copolymer, a propylene-butene copolymer, an ethylene-vinyl acetate copolymer, an ethylene-acrylic acid copolymer, an ethylene-propylene-butene copolymer, and a polyolefin-based thermoplastic elastomer. Among them, polyethylene (low-density, medium-density, high-density), polypropylene, an ethylene-propylene copolymer and a propylene-butene copolymer are preferred from the viewpoint of obtaining superior surface properties such as weatherability and scratch resistance.

Examples of the infrared-reflective pigment include a composite oxide containing manganese and at least one metal element other than manganese (hereinafter sometimes referred to as the "manganese-based composite oxide"), a metal pigment, and an inorganic pigment such as a white pigment. The metal pigment can be exemplified by aluminum, silver and brass. The white pigment can be exemplified by titanium oxide.

Titanium oxide for use as the white pigment specifically is titanium dioxide ($TiO_2$) whose crystal type may be either rutile, anatase or, rutile. The average particle size of titanium oxide is about 0.5 to 5 μm from the viewpoint of whiteness, concealing properties, dispersibility in the binder resin, and film formability or printability.

Among these infrared-reflective pigments, the manganese-based composite oxide and titanium oxide are preferred. Thus, a substrate containing the manganese-based composite oxide or a substrate containing titanium oxide is preferred as the infrared-reflective substrate.

There is no particular limitation on the metal element(s) other than manganese, contained in the manganese-based composite oxide. The metal element(s) may be appropriately selected e.g. from the viewpoint of obtaining a staid design with a lower brightness, or obtaining good heat-shielding properties.

The metal element(s) other than manganese may be used singly or in a combination of two or more thereof. Examples of the metal element(s) other than manganese include group-2 elements such as calcium and barium; group-3 elements such as yttrium, lanthanum, praseodymium and neodymium; group-4 elements such as titanium and zirconium; group-13 elements such as boron, aluminum, gallium and indium; and group-15 elements such as antimony and bismuth. Among them, the group-2 elements, the group-4 elements and the group-15 elements are preferred, calcium, titanium and bismuth are more preferred, and calcium and titanium are even more preferred.

A composite oxide containing manganese, calcium and titanium can be specifically exemplified as a particularly preferable manganese-based composite oxide.

There is no particular limitation on the structure of the manganese-based composite oxide. However, from the viewpoint of the stability, the heat-shielding properties, the design, etc. of the structure, a perovskite structure, an orthorhombic structure and a hexagonal crystal structure are preferred, and a perovskite structure is more preferred.

The manganese-based composite oxide is described, for example, in WO 2016/125907 A1.

From the viewpoint of increasing the degree of darkness, the substrate containing the manganese-based composite oxide preferably has an $L^*$ value of the CIE (International Commission on Illumination) $L^*a^*b^*$ color system, measured according to JIS Z8781-4:2013, of not more than 60, more preferably not more than 50.

The substrate containing the manganese-based composite oxide may also contain an infrared-reflective pigment or an infrared-transparent pigment other than the manganese-based composite oxide. Also in this case, the $L^*$ value of the substrate containing the manganese-based composite oxide is preferably adjusted to fall within the above range.

From the viewpoint of enhancing the heat-shielding properties, the substrate containing titanium oxide preferably has an $L^*$ value of the CIE (International Commission on Illumination) $L^*a^*b^*$ color system, measured according to JIS Z8781-4:2013, of not less than 80, more preferably not less than 90. The upper limit of the $L^*$ value of the substrate containing titanium oxide is about 95.

The substrate containing titanium oxide may also contain an infrared-reflective pigment or an infrared-transparent pigment other than the titanium oxide. Also in this case, the $L^*$ value of the substrate containing titanium oxide is preferably adjusted to fall within the above range.

When the substrate containing the manganese-based composite oxide is compared to the substrate containing titanium oxide, the latter is superior in the heat-shielding properties, while the former is superior in the degree of darkness.

When, for the infrared-transparent or infrared-reflective pigment of the below-described solid printing layer, comparison is made between (A) at least three compounds selected from the pigment group consisting of a quinacridone, an isoindolinone, a nickel azo complex and a phthalocyanine and (B) at least one compound selected from the pigment group consisting of a composite oxide containing manganese and at least one metal element other than manganese, an azomethine-azo compound and a perylene compound, the former is superior in the heat-shielding properties, while the latter is superior in the degree of darkness.

Therefore, when the substrate containing the manganese-based composite oxide is used, (A) the at least three compounds selected from the pigment group consisting of a quinacridone, an isoindolinone, a nickel azo complex and a phthalocyanine are preferably used as the pigments of the solid printing layer from the viewpoint of a balance between the heat-shielding properties and the degree of darkness. When the substrate containing titanium oxide is used, (B) the at least one compound selected from the pigment group consisting of a composite oxide containing manganese and at least one metal element other than manganese, an azomethine-azo compound and a perylene compound is preferably used as the pigment of the solid printing layer from the viewpoint of a balance between the heat-shielding properties and the degree of darkness.

The dark color herein refers to a darkish color having a low brightness and a low saturation, such as dark gray, dark green, dark blue, black, dark purple, dark red, or blown.

From the viewpoint of increasing the infrared reflectance, the content of the infrared-reflective pigment in the substrate is preferably not less than 1 part by mass, more preferably not less than 3 parts by mass, even more preferably not less than 5 parts by mass based on 100 parts by mass of the binder resin. From the viewpoint of moldability of the decorative sheet, the upper limit is preferably 50 parts by mass or less, more preferably 40 parts by mass or less, even more preferably 30 parts by mass or less, and still more preferably 20 parts by mass or less.

The substrate may optionally contain an additive. Examples of the additive include a flame retardant, an antioxidant, a lubricant, a foaming agent, an antioxidant, an ultraviolet absorber, and a light stabilizer.

There is no particular limitation on the ultraviolet absorber to be used for the substrate. Examples of the ultraviolet absorber include an organic ultraviolet absorber such as a benzotriazole ultraviolet absorber, a benzophenone ultraviolet absorber or a triazine ultraviolet absorber, and an inorganic ultraviolet absorber composed of particles of titanium oxide, iron oxide, cerium oxide, or the like, having an average particle size of not more than 380 nm, preferably not more than 100 nm.

A hindered amine light stabilizer, for example, is preferably used as the light stabilizer. In particular, a reactive group-containing hindered amine light stabilizer having a functional group with an ethylenic double bond, such as a (meth)acryloyl group, a vinyl group or an allyl group, can be preferably used.

Examples of preferable hindered amine light stabilizers include a hindered amine light stabilizer having in the molecule a (meth)acryloyl group which is an ethylenically unsaturated group, such as 2,2,6,6-tetramethyl-4-piperidyl (meth)acrylate or 1,2,2,6,6-pentamethyl-4-piperidyl (meth) acrylate; a hindered amine light stabilizer derived from an organic acid, such as 2,2,6,6-tetramethyl-4-piperidyl benzoate or 4-benzoyloxy-2,2,6,6-tetramethyl piperidine; a polycondensation product hindered amine light stabilizer such as the polycondensation product of 1-(2-hydroxyethyl)-2,2,6,6-tetramethyl-4-piperidinol and diethyl succinate or the polycondensation product of 1,6-bis(2,2,6,6-tetramethyl-4-piperidylamino) hexane and 2,4-dichloro-6-morpholino-s-triazine; and 1,5,8,12-tetrakis[2,4-bis(N-butyl-N-(2,2,6,6-tetramethyl-4-piperidyl)amino)-s-tiazin-6-yl]-1,5,8,12-tetraazadodecane, 1,5,8,12-tetrakis[2,4-bis(N-butyl-N-(1,2,2,6,6-pentamethyl-4-piperidyl)amino)-s-tiazin-6-yl]-1,5,8,12-tetraazadodecane, etc.

The content of the ultraviolet absorber in the substrate is preferably not less than 0.1 parts by mass, more preferably not less than 0.2 parts by mass, and even more preferably not less than 0.3 parts by mass based on 100 parts by mass of the binder resin. The upper limit is preferably 5 parts by mass or less, more preferably 3 parts by mass or less, and even more preferably 2 parts by mass or less.

The content of the light stabilizer in the substrate is preferably not less than 0.5 parts by mass, more preferably not less than 1 part by mass, even more preferably not less than 3 parts by mass based on 100 parts by mass of the binder resin. The upper limit is preferably 10 parts by mass or less, more preferably 8 parts by mass or less, and even more preferably 6 parts by mass or less.

When the content of the ultraviolet absorber or the light stabilizer in the substrate lies within the above range, each additive is unlikely to bleed out and can therefore achieve a full effect.

The substrate may be of a single-layer structure or of a multi-layer structure composed of two or more layers of the same type or different types.

The thickness of the substrate is preferably not less than 20 μm, more preferably not less than 30 μm, and even more preferably not less than 40 μm from the viewpoint of a balance between ease of handling and strength. The upper limit is preferably 200 μm or less, more preferably 160 μm or less, and even more preferably 100 μm or less.

In order to enhance adhesion of the substrate with another layer, such as the decorative layer constituting the decorative sheet, or with an adherend, one or both surfaces of the substrate may be subjected to a surface treatment such as a physical surface treatment using, for example, an oxidation method or a surface-roughening method, or a chemical surface treatment.

The oxidation method is exemplified by a corona discharge treatment, a chromium oxidation treatment, a flame treatment, a hot-air treatment, and an ozone/ultraviolet light treatment. The surface-roughening method is exemplified by a sandblast method and a solvent treatment method. Such a surface treatment method may be appropriately selected depending on the type of the substrate; however, in general, the corona discharge treatment method is preferably used in view of, for example, the effect and the operability of the surface treatment.

In order to enhance the interlayer adhesion between the substrate and another layer or enhance adhesion of the substrate with an adherend, the substrate may be subjected to a treatment to form a primer layer or a backside primer layer on the substrate. Such primer layers will be described later.

Preferably, from the viewpoint of the heat-shielding properties, the substrate does not substantially contain carbon black. What is meant by "not substantially contain" is that the content of carbon black is not more than 0.1% by mass, preferably not more than 0.01% by mass, even more preferably not more than 0.001% by mass, and still more preferably 0% by mass based on the total solid content of the substrate. It is preferred that the below-described solid printing layer should not substantially contain carbon black either.

The average of the spectral reflectivity values of the substrate, which are measured in the wavelength range of 780 to 2500 nm according to JIS K5602:2008, is preferably not less than 30%, more preferably not less than 35%.

<Decorative Layer>

The decorative sheet 100 of the present invention includes the substrate 10, and the decorative layer 20 disposed on the substrate 10 and including the solid printing layer 21 and the picture layer 22.

<<Solid Printing Layer>>

The solid printing layer is a layer containing an infrared-transparent or infrared-reflective pigment and a binder resin.

The infrared-transparent or infrared-reflective pigment, contained in the solid printing layer, contains (A) at least three compounds selected from the pigment group consisting of a quinacridone, an isoindolinone, a nickel azo complex and a phthalocyanine, or (B) at least one compound selected from the pigment group consisting of a composite oxide containing manganese and at least one metal element other than manganese, an azomethine-azo compound and a perylene compound.

Owing to the structure including the solid printing layer containing the pigment (A) or (B), the above-described infrared-reflective substrate and the below-described picture layer containing carbon black and the binder resin, the decorative sheet of the present invention has satisfactory heat-shielding properties and can exhibit a design which is excellent in the degree of darkness.

The pigment (A) contains at least three compounds selected from the pigment group consisting of a quinacridone, an isoindolinone, a nickel azo complex and a phthalocyanine. When the solid printing layer contains at least three compounds selected from the pigment group consisting of a quinacridone, an isoindolinone, a nickel azo complex and a phthalocyanine, the solid printing layer can be darkened while maintaining the heat-shielding properties.

The quinacridone is a compound represented by the molecular formula $C_{20}H_{12}N_2O_2$. Examples of the quinacridone include C.I.Pigment Violet 19, C.I.Pigment Red 122, C.I.Pigment Red 209, C.I.Pigment Red 202, C.I.Pigment Orange 48, and C.I.Pigment Orange 49, which differ in the crystal structure.

The isoindolinone is a compound having an indolinone skeleton. Examples of the isoindolinone include C.I.Pigment Yellow 109, C.I.Pigment Yellow 110, C.I.Pigment Yellow 173, and C.I.Pigment Orange 61.

The nickel azo complex is a coordination compound in which nickel as an electron acceptor and an azo group as an electron donor are coordination-bonded. Examples of the nickel azo complex include C.I.Pigment Green 10 and C.I.Pigment Yellow 150.

The phthalocyanine is a cyclic compound having a structure in which four phthalic imide moieties are crosslinked by nitrogen atoms. Example of the phthalocyanine include non-metallic phthalocyanines such as C.I.Pigment Blue 16, and metallic phthalocyanines such as C.I.Pigment Blue 15, C.I.Pigment Blue 15:3, C.I.Pigment Blue 15:4, C.I.Pigment Blue 15:6, C.I.Pigment Green 7, and C.I.Pigment Green 36.

The at least three compounds, selected from the pigment group consisting of a quinacridone, an isoindolinone, a nickel azo complex and a phthalocyanine, can be appropriately combined depending on the intended color, as exemplified by a combination of (i) a red pigment or an orange pigment, (ii) a yellow pigment or a green pigment and (iii) a blue pigment or a violet pigment.

Specific examples of organic pigment combinations include a combination of C.I.Pigment Red 122, C.I.Pigment Yellow 150 and C.I.Pigment Blue 15, a combination of C.I.Pigment Red 122, C.I.Pigment Yellow 109 and C.I.Pigment Blue 15, etc.

The pigment (B) contains at least one compound selected from the pigment group consisting of a composite oxide containing manganese and at least one metal element other than manganese, an azomethine-azo compound and a perylene compound. When the solid printing layer contains at least one compound selected from the pigment group consisting of the manganese-based composite oxide, an azomethine-azo compound and a perylene compound, the solid printing layer can be darkened while maintaining the heat-shielding properties.

The same manganese-based composite oxide as that described above as being usable for the infrared-reflective substrate can be used as the manganese-based composite oxide of the pigment (B).

The azomethine-azo pigment has a diazonium group which is a reaction compound of tetrachlorophthalimide and aminoaniline.

The perylene pigment is a pigment having the structure of perylenetetracarboxylic dianhydride from which two oxygen atoms constituting the six-membered ring are dropped, and can be exemplified by perylene black.

The content of the infrared-transparent or infrared-reflective pigment in the solid printing layer is preferably 5 to 80% by mass, more preferably 8 to 80% by mass, even more preferably 10 to 75% by mass based on the solid content of the solid printing layer from the viewpoint of concealing the tint of the substrate and the viewpoint of a balance of the moldability of the decorative sheet.

When the solid printing layer contains the pigment (A) as the infrared-transparent or infrared-reflective pigment, the content of the pigment (A) is preferably 5 to 60% by mass, more preferably 8 to 40% by mass, even more preferably 10 to 30% by mass based on the solid content of the solid printing layer.

When the solid printing layer contains the pigment (B) as the infrared-transparent or infrared-reflective pigment, the content of the pigment (B) is preferably 5 to 50% by mass, more preferably 5 to 40% by mass, even more preferably 5 to 30% by mass based on the solid content of the solid printing layer.

The pigment (A) and the pigment (B) may be used in combination as long as the effect of the present invention is not impaired. For example, a major amount of the pigment (A) may be used in combination with a minor amount of the pigment (B), or a major amount of the pigment (B) may be used in combination with a minor amount of the pigment (A).

It is also possible to use an additional infrared-transparent or infrared-reflective pigment(s) as long as the effect of the present invention is not impaired. The additional infrared-transparent or infrared-reflective pigment(s) can be exemplified by titanium oxide and iron oxide.

The average particle size of the infrared-transparent or infrared-reflective pigment is preferably not less than 0.1 µm, more preferably not less than 0.2 µm from the viewpoint of enhancing light absorption in the visible light range. There is no particular limitation on the upper limit of the average particle size of the infrared-transparent or infrared-reflective pigment; however, from the viewpoint of making the design of the decorative layer more delicate, the upper limit is preferably 3.0 µm or less, more preferably 2.0 µm or less, and even more preferably 1.0 µm or less.

The average particle size, as used herein, is a value which can be determined as a mass average value D50 in the measurement of a particle size distribution by a laser diffraction method.

There is no particular limitation on the binder resin of the solid printing layer. Examples of preferable binder resins include a urethane resin, an acrylic polyol resin, an acrylic resin, an ester resin, an amide resin, a butyral resin, a styrene resin, a urethane-acrylate copolymer, a polycarbonate urethane-acrylate copolymer (a urethane-acrylate copolymer derived from a polymer (polycarbonate polyol) having a carbonate bond in the polymer main chain and having two or more hydroxyl groups at the end(s) or in a side chain(s)), a vinyl chloride-vinyl acetate copolymer resin, a vinyl chloride-vinyl acetate-acrylate copolymer resin, a chlorinated propylene resin, a nitrocellulose resin, and a cellulose acetate resin. These resins can be used singly or in a combination of two or more thereof. Besides a one-component curable resin, it is possible to use various other types of resins, including a two-component curable resin containing a curing agent, for example, an isocyanate compound such as tolylene diisocyanate (TDI), diphenylmethane diisocyanate (MDI), hexamethylene diisocyanate (HDI), isophorone diisocyanate (IPID), or xylylene diisocyanate (XDI).

From the viewpoint of enhancing the weatherability, the solid printing layer and the below-described picture layer may contain a weathering agent such as an ultraviolet absorber or a light stabilizer. The ultraviolet absorber and the light stabilizer can be exemplified by the compounds described above as being usable for the substrate. From the viewpoint of enhancing the weatherability, the contents of the ultraviolet absorber and the light stabilizer may be exemplified by the same ranges as those in the surface protective layer described below.

The thickness of the solid printing layer is preferably 0.5 to 15 μm, more preferably 1 to 10 μm, and even more preferably 2 to 8 μm from the viewpoint of a balance between the concealing properties and the moldability.

The solid printing layer needs not be a so-called "full solid printing layer" which is formed on the entire area of the substrate. However, from the viewpoint of improving a balance between the heat-shielding properties and the degree of darkness, the solid printing layer preferably covers not less than 90%, more preferably not less than 95%, even more preferably not less than 99%, and still more preferably 100% of the entire area of the substrate.

When the design given by the decorative layer is a wood grain pattern, the solid printing layer preferably exhibits a wood surface pattern (portions other than a vessel pattern and/or a knot pattern of the wood grain pattern). When the design given by the decorative layer is a stone pattern such as travertine, the solid printing layer preferably exhibits a pattern other than recessed portions. When the design given by the decorative layer is a tile pattern or a brick pattern, the solid printing layer preferably exhibits the tile portions or the brick portions.

The solid printing layer may be composed of a single layer, or a laminate of a plurality of solid printing layers.

<<Picture Layer>>

The picture layer contains carbon black and a binder resin. The picture layer is formed on the opposite side of the solid printing layer of the substrate.

In the decorative sheet of the present invention, the solid printing layer having a relatively large area does not substantially contain carbon black, while the picture layer having a relatively small area contains carbon black. This makes it possible for the decorative sheet to have satisfactory heat-shielding properties and can exhibit a design which is excellent in the degree of darkness.

Common carbon black can be used.

The average particle size of carbon black is preferably 10 to 150 nm, more preferably 30 to 100 nm.

The content of carbon black in the picture layer is preferably 0.1 to 5.0% by mass, more preferably 0.5 to 2.5% by mass, even more preferably 1.0 to 2.0% by mass based on the solid content of the picture layer from the viewpoint of increasing the degree of darkness while maintaining the heat-shielding properties.

Besides the carbon black used in the above amount, the picture layer may contain an additional colorant(s). The additional colorant(s) can be a common colorant(s), for example, at least one compound selected from the organic pigment group consisting of a quinacridone, an isoindolinone, a nickel azo complex and a phthalocyanine.

The proportion of the area of the picture layer to the entire area of the decorative sheet is preferably not more than 50%, more preferably not more than 30%. The heat-shielding properties can be enhanced by making the proportion not more than 50%.

From the viewpoint of increasing the degree of darkness, the proportion is preferably not less than 20%, more preferably not less than 25%.

The entire area of the decorative sheet and the area of the picture layer containing carbon black and a binder resin each refer to the area in a plan view of the decorative sheet.

The same binder resin as the above-described binder resin of the solid printing layer can be used as the binder resin of the picture layer.

From the viewpoint of enhancing the weatherability, the picture layer may contain a weathering agent such as an ultraviolet absorber or a light stabilizer.

The ultraviolet absorber and the light stabilizer can be exemplified by the compounds described above as being usable for the substrate. From the viewpoint of enhancing the weatherability, the contents of the ultraviolet absorber and the light stabilizer may be exemplified by the same ranges as those in the surface protective layer described below.

The thickness of the picture layer is preferably 0.5 to 20 μm, more preferably 1 to 10 μm, and even more preferably 2 to 8 μm from the viewpoint of a balance between the impartation of dark color and the moldability. When the picture layer is composed of multiple layers, the thickness of each picture layer preferably lies in the above range.

There is no particular limitation on the type of the picture of the picture layer; however, since the picture is a dark-colored one containing carbon black, it is preferably of recessed portions.

When the design given by the decorative layer is a wood grain pattern, the picture layer preferably exhibits a vessel pattern and/or a knot pattern. When the design given by the decorative layer is a stone pattern such as travertine, the picture layer preferably exhibits a pattern of recessed portions. When the design given by the decorative layer is a tile pattern or a brick pattern, the picture layer preferably exhibits a pattern of the joints.

The picture layer can be formed, for example, by printing using a picture layer forming ink containing carbon black and a binder resin. The picture layer may be formed by single color printing, or by multi-color printing using a plurality of inks containing different amounts of carbon blacks and other additives. The picture layer may be composed of a single layer, or a laminate of a plurality of overlapping picture layers.

In order to enhance the premium feel provided by dark color, the decorative sheet of the present invention preferably has an L* value of the CIE (International Commission on Illumination) L*a*b* color system, measured according to JIS Z8781-4:2013, of not more than 45, more preferably not more than 40 in an area which lies in the decorative layer-side surface of the decorative sheet and in which the solid printing layer and the picture layer exist.

<Additional Picture Layer>

The decorative sheet of the present invention may also include an additional picture layer (a picture layer other than the picture layer containing carbon black and a binder resin) as a decorative layer. From the viewpoint of increasing the degree of darkness, the decorative sheet preferably does not have an additional picture layer.

The additional picture layer can be exemplified by a picture layer containing an azomethine-azo pigment and a binder resin.

<Adhesive Layer A>

The decorative sheet may optionally include an adhesive layer A.

Especially when the decorative sheet includes the below-described transparent resin layer, the provision of the adhesive layer A is effective in enhancing the interlayer adhesion between the decorative layer and the transparent resin layer. Adhesives which are generally used for decorative sheets can be used, without any limitation, as an adhesive that constitutes the adhesive layer A.

Examples of usable adhesives include a urethane adhesive, an acrylic adhesive, an epoxy adhesive, and a rubber adhesive. Among them, a urethane adhesive is preferred in terms of adhesive force. The urethane adhesive can be exemplified by an adhesive using a two-component curable urethane resin containing a polyol compound such as a polyether polyol, a polyester polyol, an acrylic polyol or a polycarbonate diol, and any of curing agents such as isocyanate compounds as described above. In addition, an acrylate-polyester-vinyl acetate resin is also a preferable adhesive which can easily develop adhesiveness upon heating and can maintain adhesive strength during use at a high temperature.

From the viewpoint of obtaining a sufficient adhesiveness, the thickness of the adhesive layer A is preferably not less than 0.1 μm, more preferably not less than 1 μm, and even more preferably not less than 2 μm. The upper limit is preferably 20 μm or less, more preferably 10 μm or less.

<Transparent Resin Layer>

From the viewpoint of protecting the decorative layer and enhancing the weatherability and the surface properties such as scratch resistance, a transparent resin layer is preferably provided on the decorative layer either directly or via another layer. The transparent resin layer may be composed of a single layer, or two or more layers.

Examples of preferable transparent resin layer-constituting resins include a polyolefin resin, a polyester resin, an acrylic resin, a polycarbonate resin, a polyurethane resin, a polystyrene resin, a vinyl chloride resin, a vinyl acetate resin, and a fluororesin.

Among them, from the viewpoint of enhancing the weatherability and the surface properties such as scratch resistance, a polyolefin resin, a polyester resin and a fluororesin are preferred, and a polyolefin resin is particularly preferred. The polyolefin resin can be exemplified by the resins described above as being usable for the substrate. Among them, a polypropylene resin is preferred.

Examples of the fluororesin include polyvinyl fluoride, polyvinylidene fluoride, polytetrafluoroethylene, an ethylene-tetrafluoroethylene copolymer, and a tetrafluoroethylene-hexafluoropropylene copolymer. These resins may be used singly or as a mixture of two or more thereof.

The transparent resin layer containing a fluororesin preferably also contains an acrylic resin such as polymethyl (meth)acrylate, polybutyl (meth)acrylate, a methyl (meth)acrylate-butyl (meth)acrylate copolymer, or an ethylene-methyl (meth)acrylate copolymer.

When the transparent resin layer containing a fluororesin is used, it is preferred to laminate an additional transparent resin layer to the fluororesin-containing transparent resin layer to form a transparent resin layer having a multi-layer structure. The additional transparent resin layer is preferably disposed on the decorative-layer side.

The transparent resin layer may optionally contain an additive. The additive can be exemplified by the additives described above as being usable for the substrate. Among such additives, a weathering agent such as an ultraviolet absorber or a light stabilizer is preferably used.

The ultraviolet absorber and the light stabilizer can be exemplified by the compounds described above as being usable for the substrate. From the viewpoint of enhancing the weatherability, the contents of these weathering agents may be exemplified by the same ranges as those in the substrate described above.

The thickness of the transparent resin layer is preferably not less than 10 μm, more preferably not less than 30 μm, even more preferably not less than 50 μm from the viewpoint of protecting the decorative layer and enhancing the surface properties such as scratch resistance and weatherability. The upper limit is preferably 150 μm or less, more preferably 120 μm or less, even more preferably 100 μm or less from the viewpoint of handling of the decorative sheet. Further, from the viewpoint of protecting the decorative layer and obtaining excellent scratch resistance, the thickness of the transparent resin layer is preferably made equal to or larger than the thickness of the substrate.

One or both surfaces of the transparent resin layer may be subjected to a physical surface treatment using, for example, an oxidation method or a surface roughening method, or a chemical surface treatment, for example to enhance the interlayer adhesion between the transparent resin layer and another layer(s). The physical or chemical surface treatment can be exemplified by the same methods as those for the surface treatment of the substrate described above.

Further, in order to enhance the interlayer adhesion between the transparent resin layer and another layer(s), one or both surfaces of the transparent resin layer may be subjected to a treatment to form a primer layer which will be described later.

<Surface Protective Layer>

A surface protective layer is preferably provided on the decorative layer of the decorative sheet either directly or via another layer(s) (the adhesive layer A, the transparent resin layer, the primer layer) mainly from the viewpoint of enhancing the surface properties such as scratch resistance and weatherability.

The surface protective layer is formed of a cured product of a resin composition containing a curable resin.

Besides a thermosetting resin such as a two-component curable resin, an ionizing radiation-curable resin or the like is preferably used as the curable resin which is used for the formation of the surface protective layer. The curable resin may be of a so-called hybrid type which uses a combination of such resins, for example, a combination of an ionizing radiation-curable resin and a thermosetting resin, or a combination of a curable resin and a thermoplastic resin.

An ionizing radiation-curable resin is preferred as the curable resin from the viewpoints of increasing the crosslinking density of the resin constituting the surface protective layer and obtaining superior surface properties such as scratch resistance and weatherability. An electron beam-curable resin is more preferred from the viewpoint of easy handling.

<<Ionizing Radiation-Curable Resin>>

The ionizing radiation-curable resin is a resin which is capable of being crosslinked and cured upon irradiation with ionizing radiation and which has an ionizing radiation-curable functional group. The ionizing radiation-curable functional group herein refers to a group capable of being crosslinked and cured upon irradiation with ionizing radiation. A functional group having an ethylenic double bond, such as a (meth)acryloyl group, a vinyl group or an allyl group, is an exemplary preferable ionizing radiation-curable functional group. The ionizing radiation refers to electromagnetic radiation or charged particle radiation having an energy quantum that can polymerize or crosslink molecules. While ultraviolet (UV) radiation or electron beam (EB) radiation is generally used, electromagnetic radiation, such as an X-ray radiation or γ-ray radiation, or charged particle radiation, such as an α-ray radiation or ion beam radiation, may also be used.

A specific ionizing radiation-curable resin to be used can be appropriately selected from among polymerizable monomers and polymerizable oligomers which are conventionally used as ionizing radiation-curable resins.

A (meth)acrylate monomer having a radical-polymerizable unsaturated group in the molecule, in particular a polyfunctional (meth)acrylate monomer, is preferably used as a polymerizable monomer. As used herein, "(meth)acrylate" refers to "acrylate or methacrylate".

The polyfunctional (meth)acrylate monomer can be exemplified by a (meth)acrylate monomer having 2 or more ionizing radiation-curable functional groups in the molecule and having at least a (meth)acryloyl group as the functional group. From the viewpoint of obtaining superior surface properties such as scratch resistance and weatherability, an acrylate monomer having an acryloyl group is preferred.

From the viewpoint of obtaining superior surface properties such as scratch resistance and weatherability, the number of the functional groups is preferably not less than 2. The upper limit is preferably 8 or less, more preferably 6 or less, even more preferably 4 or less, and particularly preferably 3 or less. These polyfunctional (meth)acrylate monomers may be used singly or in a combination of two or more.

The polymerizable oligomer can be exemplified by a (meth)acrylate oligomer having 2 or more ionizing radiation-curable functional groups in the molecule and having at least a (meth)acryloyl group as the functional group. Examples of the (meth)acrylate oligomer include a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (meth)acrylate oligomer.

Examples of the polymerizable oligomer further include a highly hydrophobic polybutadiene (meth)acrylate oligomer having a (meth)acrylate group in a side chain of a polybutadiene oligomer, a silicone (meth)acrylate oligomer having a polysiloxane bond in the main chain; an aminoplast resin (meth)acrylate oligomer obtained by modifying an aminoplast resin having a number of reactive groups in the small molecule, and an oligomer having a cation-polymerizable functional group in the molecule such as a novolak epoxy resin, a bisphenol epoxy resin, an aliphatic vinyl ether, an aromatic vinyl ether, or the like.

These polymerizable oligomers may be used singly or in a combination of two or more thereof. From the viewpoint of obtaining superior surface properties such as scratch resistance and weatherability, a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (met) acrylate oligomer are preferred, and a urethane (meth)acrylate oligomer and a polycarbonate (meth)acrylate oligomer are more preferred.

From the viewpoint of obtaining superior surface properties such as scratch resistance and weatherability, the number of functional groups of each of the polymerizable oligomers is preferably not less than 2. The upper limit is preferably 8 or less, more preferably 6 or less, even more preferably 4 or less, and still more preferably 3 or less.

From the viewpoint of obtaining superior surface properties such as scratch resistance and weatherability, the weight-average molecular weight of each of the polymerizable oligomer is preferably not less than 2,500, more preferably not less than 3,000, and even more preferably not less than 3,500. The upper limit is preferably 15,000 or less, more preferably 12,500 or less, and even more preferably 11,000 or less. The weight-average molecular weight herein refers to an average molecular weight which is measured by GPC analysis and calculated in terms of standard polystyrene.

In order to reduce the viscosity of the ionizing radiation-curable resin, a monofunctional (meth)acrylate can be appropriately used together with the above-described polyfunctional (meth)acrylate. It is also possible to use a combination of two or more types of monofunctional (meth)acrylates.

The ionizing radiation-curable resin preferably contains the polymerizable oligomer from the viewpoint of enhancing the surface properties such as scratch resistance and weatherability. The content of the polymerizable oligomer in the ionizing radiation-curable resin is preferably not less than 80% by mass, more preferably not less than 90% by mass, even more preferably not less than 95% by mass, and still more preferably 100% by mass.

The curable resin composition constituting the surface protective layer preferably contains an ultraviolet absorber. When the surface protective layer contains the ultraviolet absorber, the ultraviolet absorber can be held stably in the surface protective layer. This ensures excellent weatherability of the decorative sheet even when used in a severe environment.

The ultraviolet absorber can be exemplified by a benzotriazole ultraviolet absorber, a benzophenone ultraviolet absorber and a triazine ultraviolet absorber, which have been described above as ultraviolet absorbers usable in the substrate. Among them, a triazine ultraviolet absorber is preferred.

The curable resin composition constituting the surface protective layer preferably contains a light stabilizer from the viewpoint of enhancing the weatherability. A hindered amine light stabilizer is preferably used as the light stabilizer, and can be exemplified by the light stabilizers described above as being usable for the substrate. A hindered amine light stabilizer derived from decanedioic acid (sebacic acid) is preferred from the viewpoint of weatherability.

Such ultraviolet absorbers or light stabilizers can be used singly or in a combination of two or more thereof in the surface protective layer. The ultraviolet absorber or the light stabilizer may be one having a reactive functional group with an ethylenic double bond, such as a (meth)acryloyl group, a vinyl group or an allyl group. Such an ultraviolet absorber or light stabilizer is unlikely to bleed out due to interaction with the curable resin constituting the surface protective layer, and therefore can be used in a larger amount, resulting in superior weatherability of the decorative sheet.

The content of the ultraviolet absorber in the surface protective layer is preferably not less than 0.1 parts by mass, more preferably not less than 0.2 parts by mass, even more preferably not less than 0.3 parts by mass, and still more preferably not less than 0.5 parts by mass based on 100 parts by mass of the curable resin constituting the surface protective layer. The upper limit is preferably 20 parts by mass or less, more preferably 10 parts by mass or less.

The content of the light stabilizer in the surface protective layer is preferably not less than 0.1 parts by mass, more preferably not less than 0.5 parts by mass, even more preferably not less than 1 part by mass, and still more preferably not less than 1.5 parts by mass based on 100 parts by mass of the curable resin constituting the surface protective layer. The upper limit is preferably 10 parts by mass or less, more preferably 8 parts by mass or less, even more preferably 5 parts by mass or less, and still more preferably 3 parts by mass or less. When the content of the ultraviolet absorber or the light stabilizer in the surface protective layer lies within the above range, the additive is unlikely to bleed out and can therefore achieve a full effect.

Besides the ultraviolet absorber and the light stabilizer, the surface protective layer may also contain an additive(s) such as an ultraviolet blocking agent, an abrasion-resistance enhancer, a polymerization inhibitor, a crosslinking agent, an antistatic agent, an adhesion improver, a levelling agent, a thixotropy-imparting agent, a coupling agent, a plasticizer, a defoamer, a filler, a blocking inhibitor, a lubricant, and a solvent as long as the use of the additive(s) does not depart from the object of the present invention.

From the viewpoint of enhancing the surface properties such as scratch resistance and weatherability, the thickness of the surface protective layer is preferably not less than 2 μm, more preferably not less than 3 μm, and even more preferably not less than 4 μm. From the viewpoint of preventing cracking of the surface protective layer upon molding of the decorative sheet, the thickness of the surface protective layer is preferably not more than 15 μm, more preferably not more than 10 μm, and even more preferably not more than 8 μm.

<Primer Layer>

The decorative sheet may optionally include a primer layer. The primer layer is provided mainly to enhance interlayer adhesion. In the case where the primer layer is provided on the opposite side of the substrate from the surface protective layer (such a primer layer is also referred to as a "backside primer layer"), the primer layer can enhance the interlayer adhesion between the substrate and an adherend.

The primer layer may be provided in at least one position selected from a position between the substrate and the decorative layer, a position between the adhesive layer A and the transparent resin layer, a position between the transparent resin layer and the surface protective layer, and a position on the surface of the substrate on the side opposite to the decorative layer.

A resin composition, obtained by appropriately mixing a binder, a curing agent, a weathering agent(s) such as an ultraviolet absorber and a light stabilizer, and an additive(s) such as a blocking inhibitor, can be used for the formation of the primer layer.

The binder can be preferably exemplified by the resins described above as binders usable for the solid printing layer. Such resins can be used singly or in a combination of two or more thereof. For example, a mixture of a polycarbonate urethane-acrylate copolymer and an acrylic polyol resin can be used as the binder.

Besides a one-component curable resin, it is possible to use various other types of resins, including a two-component curable resin containing a curing agent, for example an isocyanate compound such as tolylene diisocyanate (TDI), diphenylmethane diisocyanate (MDI), hexamethylene diisocyanate (HDI), isophorone diisocyanate (IPID), or xylylene diisocyanate (XDI).

From the viewpoint of enhancing the weatherability, the primer layer preferably contains a weathering agent such as an ultraviolet absorber or a light stabilizer. The ultraviolet absorber and the light stabilizer can be exemplified by the compounds described above as being usable for the substrate.

The content of the ultraviolet absorber in the primer layer is preferably not less than 1 part by mass, more preferably not less than 5 parts by mass, even more preferably not less than 10 parts by mass based on 100 parts by mass of the resin constituting the primer layer. The upper limit is preferably 40 parts by mass or less, more preferably 30 parts by mass or less, and even more preferably 25 parts by mass or less.

The content of the light stabilizer in the primer layer is preferably not less than 0.5 parts by mass, more preferably not less than 1 part by mass, even more preferably not less than 1.5 parts by mass, and still more preferably not less than 2 parts by mass based on 100 parts by mass of the resin constituting the primer layer. The upper limit is preferably 20 parts by mass or less, more preferably 15 parts by mass or less, even more preferably 10 parts by mass or less, and still more preferably 8 parts by mass or less.

When the content of the ultraviolet absorber or the light stabilizer in the primer layer lies within the above range, the primer layer can have excellent primer characteristics and excellent weatherability.

From the viewpoint of enhancing interlayer adhesion and reducing the thermal contraction of each layer, the thickness of the primer layer is preferably not less than 1 μm, more preferably not less than 2 μm, and even more preferably not less than 3 μm. The upper limit is preferably 10 μm or less, more preferably 8 μm or less, and even more preferably 6 μm or less.

The decorative sheet may have surface irregularities formed, for example, by an embossing process.

The embossing process can be performed by heating the decorative sheet preferably at a temperature of not less than 80° C. and not more than 260° C., more preferably not less than 85° C. and not more than 160° C., even more preferably not less than 100° C. and not more than 140° C., and pressing an embossing plate against the decorative sheet. The embossing plate is preferably pressed against the decorative layer-side surface of the substrate of the decorative sheet.

The decorative sheet of the present invention can be used as a decorative sheet for an architectural member or structure such as a floor, a wall, a window, a door, a handrail, a fence, a railing or floor grates; a part or component of a vehicle such as an automobile, e.g. a dashboard, a glove box, an instrument panel upper case, a center console or a floor console; and so forth. In particular, the decorative sheet of the present invention can be advantageously used as a decorative sheet for a window frame which suffers from the problem of heat generation caused by sunlight irradiation, or an interior part or component of a vehicle such as an automobile.

[Decorative Material]

The decorative material of the present invention includes an adherend and the above-described decorative sheet of the present invention. More specifically, the decorative material is a laminate of the adherend and the decorative sheet, in which the surface of the adherent on the side that requires decoration faces the substrate-side surface of the decorative sheet.

<Adherend>

The adherend can be exemplified by plates, such as flat plates or curved plates, made of a variety of materials, an article having a three-dimensional shape, and a sheet (or a film). Specific examples may include a wood member for use as an article having a three-dimensional shape or as a plate material such as a single wood plate, a plywood plate, a particle board or a wood fiberboard, e.g. an MDF (medium-density fiberboard), made of a variety of woods such as Japanese cedar, Japanese cypress, pine, and lauan; a metal member for use as a plate material of iron, aluminum, or the like, a steel plate, an article having a three-dimensional shape, or a sheet; a ceramic member for use as a plate member or an article having a three-dimensional shape, made of glass, ceramics such as pottery, a non-cement ceramic material such as gypsum, or a non-pottery ceramic material such as ALC (autoclaved lightweight concrete); and a resin member for use as a plate material, an articles having a three-dimensional shape or a sheet, e.g. made of an acrylic resin, a polyester resin, a polystyrene resin, a polyolefin resin such as polypropylene, an ABS (acrylonitrile-butadiene-styrene copolymer) resin, a phenol resin, a vinyl chloride resin, a cellulose resin, or a rubber. These members can be used singly or in a combination of two or more thereof.

While the thickness of the adherend may be appropriately selected depending on the intended use and the material, it is preferably not less than 0.1 mm and not more than 10 mm, more preferably not less than 0.3 mm and not more than 5 mm, and even more preferably not less than 0.5 mm and not more than 3 mm.

<Adhesive Layer B>

In order to obtain excellent adhesion between an adherend and the decorative sheet, they are preferably attached to each other via an adhesive layer B.

There is no particular limitation on an adhesive to be used for the adhesive layer B, and known adhesives can be used. For example, a heat-sensitive adhesive or a pressure-sensitive adhesive can be preferably used. Examples of resins which are usable for the adhesive constituting the adhesive layer B include an acrylic resin, a polyurethane resin, a vinyl chloride resin, a vinyl acetate resin, a vinyl chloride-vinyl acetate copolymer resin, a styrene-acrylate copolymer resin, a polyester resin, and a polyamide resin. These resins can be used singly or in a combination of two or more thereof. A two-component curable polyurethane or polyester adhesive, using an isocyanate compound or the like as a curing agent, can also be used.

A gluing agent may also be used for the adhesive layer B. An acrylic, urethane, silicone or rubber gluing agent can be appropriately selected and used.

While there is no particular limitation on the thickness of the adhesive layer B, it is preferably not less than 1 μm and not more than 100 μm, more preferably not less than 5 μm and not more than 50 μm, and even more preferably not less than 10 μm and not more than 30 μm from the viewpoint of obtaining excellent adhesiveness.

<Decorative Material Production Method>

The decorative material can be produced through a process of laminating the decorative sheet and an adherend together.

The process involves laminating an adherend and the decorative sheet of the present invention, with the surface of the adherend on the side that requires decoration facing the substrate-side surface of the decorative sheet. As a method of laminating the adherend and the decorative sheet, for example, there is a lamination method which includes pressing and laminating the decorative sheet onto the adherend in a plate-like shape via the adhesive layer B by using a pressure roller.

In the case of using a hot-melt adhesive (heat-sensitive adhesive) as the adhesive, the heating temperature is preferably not less than 160° C. and not more than 200° C., though it may vary depending on the type of the resin constituting the adhesive. In the case of using a reactive hot-melt adhesive, the heating temperature is preferably not less than 100° C. and not more than 130° C. When the process is performed by vacuum forming, the process is generally carried out while heating the decorative sheet and the adherend preferably at a temperature of not less than 80° C. and not more than 130° C., more preferably not less than 90° C. and not more than 120° C.

The thus-obtained decorative material can be used as an architectural member or structure such as a floor, a wall, a window, a door, a handrail, a fence, a railing or floor grates; a part or component of a vehicle such as an automobile, e.g. a dashboard, a glove box, an instrument panel upper case, a center console or a floor console; and so forth. In particular, the decorative material of the present invention can be advantageously used as an interior or exterior decorative material, such as a decorative material for a window frame which suffers from the problem of heat generation caused by sunlight irradiation, or a decorative material for an interior or exterior part or component of a vehicle such as an automobile.

EXAMPLES

The following examples illustrate the present invention in greater detail and are not intended to limit the scope of the invention.

1. Measurement and Evaluation 1-1. Heat-Shielding Properties

Using a 200 W lamp (incandescent lamp manufacture by Iwasaki Electric Co., Ltd.), decorative materials obtained in Examples and Comparative Examples were irradiated with light, emitted from a height of 30 cm, under the conditions of room temperature (23° C.) and a relative humidity of 50%, and 10 minutes later, the surface temperature of each decorative sheet was measured, and evaluated by the following criteria:

A: the surface temperature was not less than 85° C. and less than 90° C.

B: the surface temperature was not less than 90° C. and less than 95° C.

C: the surface temperature was not less than 95° C. and less than 100° C.

1-2. Degree of Darkness of Wood Grain Design

The decorative sheets of Examples and Comparative Examples were observed from their surface protective layers, and the degree of darkness of a wood grain design was evaluated for each sheet using the decorative sheet of Comparative Example 1 as a reference, The evaluation was made by 20 participants on the following rating scores: "3" indicates a wood grain design whose degree of darkness is far superior to the reference; "2" indicates a wood grain design whose degree of darkness is superior to the reference; and "1" indicates a wood grain design whose degree of darkness is comparable to or inferior to the reference. The average of the scores was calculated, and evaluated by the following criteria. The results are shown in Table 1 below. The decorative sheet of Comparative Example 1 as a reference was rated as "C".

<Evaluation Criteria>
A: the average is not less than 2.0
B: the average is not less than 1.5 and less than 2.0
C: the average is not less than 1.0 and less than 1.5

2. Production of Decorative Sheets and Decorative Materials

Example 1

A substrate containing a manganese-based composite oxide (having a thickness of 60 μm, an average spectral reflectivity of 35% in the wavelength range of 780 to 2500 nm, and an L* value of 58) was prepared as an infrared-reflective substrate. A solid printing layer forming ink 1 having the following formulation was applied by gravure coating to one surface of the sheet, followed by drying to form a solid printing layer (with a wood surface pattern) having a thickness of 4 μm.

<Solid Printing Layer Forming Ink 1>

| | |
|---|---|
| Binder resin (acrylic urethane resin) | 76 parts by mass |
| Red pigment (C.I. Pigment Red 122) (average particle size: 0.13 μm) | 10 parts by mass |
| Yellow pigment (C.I. Pigment Yellow 150) (average particle size: 0.05 μm) | 9 parts by mass |
| Blue pigment (C.I. Pigment Blue 15) (average particle size: 0.04 μm) | 5 parts by mass |
| Diluting solvent | q.s. |

Next, a picture layer forming ink 1 having the following formulation was applied by gravure coating onto the solid printing layer, followed by drying to form a picture layer (with a vessel pattern) having a thickness of 7 μm, thereby forming a decorative layer having a wood grain pattern and including of the solid printing layer and the picture layer. The proportion of the area of the picture layer to the entire area of the decorative sheet was made 20%.

<Picture Layer Forming Ink 1>

| | |
|---|---|
| Binder resin (acrylic urethane resin) | 80 parts by mass |
| Red pigment (C.I. Pigment Red 122) (average particle size: 0.13 μm) | 12 parts by mass |
| Yellow pigment (C.I. Pigment Yellow 150) (average particle size: 0.05 μm) | 6 parts by mass |
| Black pigment (carbon black) | 2 parts by mass |
| Diluting solvent | q.s. |

Next, an adhesive layer (polyester resin, thickness: 5 μm) was formed on the picture layer, and a transparent resin layer (transparent polypropylene resin, thickness: 80 μm) was laminated to the adhesive layer by an extrusion lamination method.

Next, the surface of the transparent resin layer was subjected to a corona discharge treatment, and then a two-component curable urethane resin composition was applied to the surface of the transparent resin layer to form a primer layer (thickness: 2 μm).

Next, a surface protective layer forming ink having the following formulation was applied onto the primer layer by roll coating, and the coating was irradiated with electron beam by using an electron beam irradiation apparatus under the conditions of: oxygen concentration 200 ppm; acceleration voltage 175 KeV; and irradiance level 5 Mrad, thereby curing the ionizing radiation-curable resin composition to form a surface protective layer having a thickness of 3 μm. A decorative sheet of Example 1 was thus produced.

<Surface Protective Layer Forming Ink>

| | |
|---|---|
| Trifunctional urethane-acrylate oligomer (weight-average molecular weight 5000) | 100 parts by mass |
| Inorganic filler (silica particles, average particle size: 5 μm) | 25 parts by mass |

A coated steel plate (thickness: 0.4 mm), to which an adhesive composed of a two-component curable urethane resin had been applied, was placed in an oven and cured at 150° C. for one minute. Immediately thereafter, the coated steel and the above decorative sheet were bonded together by using a roll laminator to obtain a decorative sheet of Example 1. The bonding was performed with the adhesive coating-side surface of the coated steel plate facing the white polypropylene sheet-side surface of the decorative sheet.

The above evaluations were made on the decorative sheet and the decorative material obtained. The evaluation results are shown in Table 1 below.

Example 2

A decorative sheet and a decorative material of Example 2 were produced in the same manner as in Example 1 except for changing the solid printing layer forming ink 1 to a solid printing layer forming ink 2 having the following formulation.

<Solid Printing Layer Forming Ink 2>

| | |
|---|---|
| Binder resin (acrylic urethane resin) | 30 parts by mass |
| Infrared-reflective pigment ($TiO_2$) | 50 parts by mass |
| Infrared-transparent pigment (FeOOH) (average particle size: 0.1 μm) | 9 parts by mass |
| Infrared-transparent pigment ($Fe_2O_3$) (average particle size: 0.1 μm) | 6 parts by mass |
| Infrared-reflective pigment (composite oxide containing manganese, calcium and titanium as metal elements) (black pigment MPT-370 manufacture by Ishihara Sangyo Kaisha Ltd., average primary particle size 0.8 μm) | 5 parts by mass |
| Diluting solvent | q.s. |

Example 3

A decorative sheet and a decorative material of Example 3 were produced in the same manner as in Example 1 except for changing the infrared-reflective substrate to a substrate containing titanium oxide (having a thickness of 60 μm, an average spectral reflectivity of 40% in the wavelength range of 780 to 2500 nm, and an L* value of 90), and changing the solid printing layer forming ink 1 to the solid printing layer forming ink 2 having the above formulation.

Example 4

A decorative sheet and a decorative material of Example 4 were produced in the same manner as in Example 1 except for changing the infrared-reflective substrate to a substrate containing titanium oxide (having a thickness of 60 μm, an average spectral reflectivity of 40% in the wavelength range of 780 to 2500 nm, and an L* value of 90).

Comparative Example 1

A decorative sheet and a decorative material of Comparative Example 1 were produced in the same manner as in Example 1 except for changing the infrared-reflective substrate to a substrate containing titanium oxide (having a thickness of 60 μm, an average spectral reflectivity of 40% in the wavelength range of 780 to 2500 nm, and an L* value of 90), and changing the picture layer forming ink 1 to a picture layer forming ink 2 having the following formulation.

<Picture Layer Forming Ink 2>

| | |
|---|---|
| Binder resin (acrylic urethane resin) | 80 parts by mass |
| Red pigment (C.I. Pigment Red 122) (average particle size: 0.13 μm) | 6 parts by mass |
| Yellow pigment (C.I. Pigment Yellow 150) (average particle size: 0.05 μm) | 9 parts by mass |
| Black pigment (azomethine-azo pigment) (average particle size: 0.2 μm) | 5 parts by mass |
| Diluting solvent | q.s. |

Comparative Example 2

A decorative sheet and a decorative material of Comparative Example 2 were produced in the same manner as in Example 1 except for changing the infrared-reflective substrate to a substrate containing titanium oxide (having a thickness of 60 μm, an average spectral reflectivity of 40% in the wavelength range of 780 to 2500 nm, and an L* value of 90), changing the solid printing layer forming ink 1 to a picture layer forming ink 3 having the following formulation, and changing the picture layer forming ink 1 to a picture layer forming ink 3 having the following formulation.

<Solid Printing Layer Forming Ink 3>

| | |
|---|---|
| Binder resin (acrylic urethane resin) | 80 parts by mass |
| Red pigment (C.I. Pigment Red 122) (average particle size: 0.13 μm) | 6 parts by mass |
| Yellow pigment (C.I. Pigment Yellow 150) (average particle size: 0.05 μm) | 9 parts by mass |
| Black pigment (azomethine-azo pigment) (average particle size: 0.2 μm) | 5 parts by mass |
| Diluting solvent | q.s. |

<Picture Layer Forming Ink 3>

| | |
|---|---|
| Binder resin (acrylic urethane resin) | 76 parts by mass |
| Red pigment (C.I. Pigment Red 122) (average particle size: 0.13 μm) | 10 parts by mass |
| Yellow pigment (C.I. Pigment Yellow 150) (average particle size: 0.05 μm) | 9 parts by mass |
| Blue pigment (C.I. Pigment Blue 15) (average particle size: 0.04 μm) | 5 parts by mass |
| Diluting solvent | q.s. |

Comparative Example 3

A decorative sheet and a decorative material of Comparative Example 3 were produced in the same manner as in Example 1 except for changing the infrared-reflective substrate to a substrate containing titanium oxide (having a thickness of 60 μm, an average spectral reflectivity of 40% in the wavelength range of 780 to 2500 nm, and an L* value of 90), changing the solid printing layer forming ink 1 to a picture layer forming ink 4 having the following formulation, and changing the picture layer forming ink 1 to a picture layer forming ink 4 having the following formulation.

<Solid Printing Layer Forming Ink 4>

| | |
|---|---|
| Binder resin (acrylic urethane resin) | 80 parts by mass |
| Red pigment (C.I. Pigment Red 122) (average particle size: 0.13 μm) | 8 parts by mass |
| Yellow pigment (C.I. Pigment Yellow 150) (average particle size: 0.05 μm) | 10 parts by mass |
| Black pigment (carbon black) | 2 parts by mass |
| Diluting solvent | q.s. |

<Picture Layer Forming Ink 4>

| | |
|---|---|
| Binder resin (acrylic urethane resin) | 78 parts by mass |
| Red pigment (C.I. Pigment Red 122) (average particle size: 0.13 μm) | 6 parts by mass |
| Yellow pigment (C.I. Pigment Yellow 150) (average particle size: 0.05 μm) | 8 parts by mass |
| Black pigment (carbon black) | 8 parts by mass |
| Diluting solvent | q.s. |

TABLE 1

| | Examples | | | | Comp. Examples | | |
|---|---|---|---|---|---|---|---|
| | 1 | 2 | 3 | 4 | 1 | 2 | 3 |
| Heat-shielding properties | A | B | A | A | A | A | C |
| Degree of darkness | A | A | A | B | C | C | A |

The results in Table 1 verify that the decorative sheets of the Examples are excellent in the heat-shielding properties, and can exhibit a design which is excellent in the degree of darkness.

INDUSTRIAL APPLICABILITY

The decorative sheet of the present invention has excellent heat-shielding properties and can exhibit a design which is excellent in the degree of darkness. Therefore, the decorative sheet of the present invention is useful as a decorative sheet for an architectural member or structure such as a floor, a wall, a window, a door, a handrail, a fence, a railing or floor grates; a part or component of a vehicle such as an automobile, e.g. a dashboard, a glove box, an instrument panel upper case, a center console or a floor console; and so forth. In particular, the decorative sheet of the present invention is extremely useful as a decorative sheet for a window frame which suffers from the problem of heat generation caused by sunlight irradiation, or an interior part or component of a vehicle such as an automobile.

REFERENCE SIGNS LIST

10: substrate
21: solid printing layer
22: picture layer
20: decorative layer
30: transparent resin layer
40: surface protective layer
100: decorative sheet

The invention claimed is:

1. A decorative sheet comprising an infrared-reflective substrate, and a decorative layer disposed on the substrate and including a solid printing layer and a picture layer,
wherein the decorative sheet comprises a decorative layer, a transparent resin layer, a protective layer in this order, wherein the solid printing layer contains an infrared-transparent or infrared-reflective pigment and a binder resin, the infrared-transparent or infrared-reflective pigment containing (A) at least three compounds selected from the pigment group consisting of a quinacridone, an isoindolinone, a nickel azo complex and a phthalocyanine, or (B) at least one compound selected from the pigment group consisting of a composite oxide containing manganese and at least one metal element other than manganese, an azomethine-azo compound and a perylene compound, wherein the picture layer contains carbon black and a binder resin, wherein the infrared-reflective substrate contains titanium oxide, wherein the infrared-reflective substrate has an L* value of the CIE (International Commission on Illumination) L*a*b* color system, measured according to JIS Z8781-4:2013, of not less than 80, and wherein the proportion of the area of the picture layer to the entire area of the decorative sheet is not more than 50%.

2. The decorative sheet according to claim 1, wherein the solid printing layer contains the infrared-transparent or infrared-reflective pigment in an amount of 5 to 80% by mass based on the solid content of the solid printing layer.

3. The decorative sheet according to claim 1, wherein the thickness of the solid printing layer is 0.5 to 15 μm.

4. The decorative sheet according to claim 1, wherein the picture layer contains the carbon black in an amount of 0.1 to 5.0% by mass based on the solid content of the picture layer.

5. The decorative sheet according to claim 1, wherein the thickness of the picture layer is 0.5 to 20 μm.

6. The decorative sheet according to claim 1, wherein the infrared-transparent or infrared-reflective pigment contains (B) at least one compound selected from the pigment group consisting of a composite oxide containing manganese and at least one metal element other than manganese, an azomethine-azo compound and a perylene compound.

7. The decorative sheet according to claim 1, wherein the decorative sheet has an L* value of the CIE (International Commission on Illumination) L*a*b* color system, measured according to JIS Z8781-4:2013, of not more than 45 in an area which lies in the decorative layer-side surface of the decorative sheet and in which the solid printing layer and the picture layer exist.

8. A decorative material comprising an adherend and the decorative sheet according to claim 1.

9. The decorative sheet according to claim 1, wherein the solid printing layer covers not less than 90% of the entire area of the substrate.

10. The decorative sheet according to claim 1, wherein the proportion of the area of the picture layer to the entire area of the decorative sheet is not less than 20%.

11. The decorative sheet according to claim 1, wherein the content of the pigment (B) in the solid printing layer is 5 to 30% by mass based on the solid content of the solid printing layer.

12. A decorative sheet comprising an infrared-reflective substrate, and a decorative layer disposed on the substrate and including a solid printing layer and a picture layer, wherein the decorative sheet comprises a decorative layer, a transparent resin layer, a protective layer in this order, wherein the solid printing layer contains an infrared-transparent or infrared-reflective pigment and a binder resin, the infrared-transparent or infrared-reflective pigment containing (A) at least three compounds selected from the pigment group consisting of a quinacridone, an isoindolinone, a nickel azo complex and a phthalocyanine, or (B) at least one compound selected from the pigment group consisting of a composite oxide containing manganese and at least one metal element other than manganese, an azomethine-azo compound and a perylene compound, wherein the picture layer contains carbon black and a binder resin, wherein the infrared-reflective substrate contains a composite oxide containing manganese and at least one metal element other than manganese, and wherein the proportion of the area of the picture layer to the entire area of the decorative sheet is not more than 50%.

13. The decorative sheet according to claim 12, wherein the infrared-reflective substrate has an L* value of the CIE (International Commission on Illumination) L*a*b* color system, measured according to JIS Z8781-4:2013, of not more than 60.

14. The decorative sheet according to claim 12, wherein the infrared-transparent or infrared-reflective pigment contains (A) at least three compounds selected from the pigment group consisting of a quinacridone, an isoindolinone, a nickel azo complex and a phthalocyanine.

15. The decorative sheet according to claim 12, wherein the solid printing layer contains the infrared-transparent or infrared-reflective pigment in an amount of 5 to 80% by mass based on the solid content of the solid printing layer.

16. The decorative sheet according to claim 12, wherein the thickness of the solid printing layer is 0.5 to 15 μm.

17. The decorative sheet according to claim 12, wherein the picture layer contains the carbon black in an amount of 0.1 to 5.0% by mass based on the solid content of the picture layer.

18. The decorative sheet according to claim 12, wherein the thickness of the picture layer is 0.5 to 20 μm.

19. A decorative material comprising an adherend and the decorative sheet according to claim 12.

* * * * *